(12) United States Patent
Saitou et al.

(10) Patent No.: US 8,973,975 B2
(45) Date of Patent: Mar. 10, 2015

(54) STRUCTURE FOR FRONT PORTION OF VEHICLE BODY

(75) Inventors: Isao Saitou, Wako (JP); Kouji Nagata, Wako (JP); Yoshitaka Murakami, Wako (JP); Yosuke Shoji, Wako (JP); Hidenori Machii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/232,935

(22) PCT Filed: Apr. 12, 2012

(86) PCT No.: PCT/JP2012/059992
§ 371 (c)(1),
(2), (4) Date: Jan. 15, 2014

(87) PCT Pub. No.: WO2013/018401
PCT Pub. Date: Feb. 7, 2013

(65) Prior Publication Data
US 2014/0152051 A1    Jun. 5, 2014

(30) Foreign Application Priority Data

Jul. 30, 2011    (JP) .................................. 2011-167870

(51) Int. Cl.
*B62D 21/15*    (2006.01)
*B62D 25/08*    (2006.01)
*B62D 25/20*    (2006.01)

(52) U.S. Cl.
CPC ............ *B62D 21/155* (2013.01); *B62D 21/152* (2013.01); *B62D 25/085* (2013.01); *B62D 21/15* (2013.01); *B62D 25/08* (2013.01); *B62D 25/20* (2013.01)
USPC .................................................... 296/187.09

(58) Field of Classification Search
CPC .... B62D 21/15; B62D 21/152; B62D 21/155; B62D 25/08; B62D 25/085
USPC ............... 296/187.03, 187.08, 187.09, 187.1, 296/193.09, 203.02, 205; 280/124.109, 280/784; 180/299
See application file for complete search history.

(56) References Cited

U.S. PATENT DOCUMENTS

2003/0025359 A1    2/2003    Takahashi et al.
2005/0218645 A1    10/2005    Shinta et al.
(Continued)

FOREIGN PATENT DOCUMENTS

| JP | H04-138974 A | 5/1992 |
|----|--------------|--------|
| JP | 2002-160664 A | 6/2002 |
| JP | 2003-160060 A | 6/2003 |
| JP | 2004-331002 A | 11/2004 |
| JP | 2005-297588 A | 10/2005 |
| JP | 2006-137326 A | 6/2006 |

(Continued)

*Primary Examiner* — Glenn Dayoan
*Assistant Examiner* — Jason S Daniels
(74) *Attorney, Agent, or Firm* — Carrier Blackman & Associates, P.C.; Joseph P. Carrier; William D. Blackman

(57) ABSTRACT

A structure for the front portion of a vehicle body includes both an under load path member and a front load transmission member. The under load path member is extended toward the rear of the vehicle body from a lower bulk member to a sub-frame. The front load transmission member is provided at a position closer to the front of the vehicle body than the under load path member and closer to the rear of the vehicle body than the front end of the bottom of the lower bulk member, and transmits to the under load path member a load which is inputted from in front of the vehicle body. A gap is formed between the front load transmission member and the under load path member.

4 Claims, 11 Drawing Sheets

(56) References Cited

U.S. PATENT DOCUMENTS

2009/0058134 A1* 3/2009 Hiraishi et al. .......... 296/187.09
2011/0095568 A1* 4/2011 Terada et al. ............ 296/187.09

FOREIGN PATENT DOCUMENTS

JP    2007-131135 A    5/2007
JP    2010-280238 A    12/2010

* cited by examiner

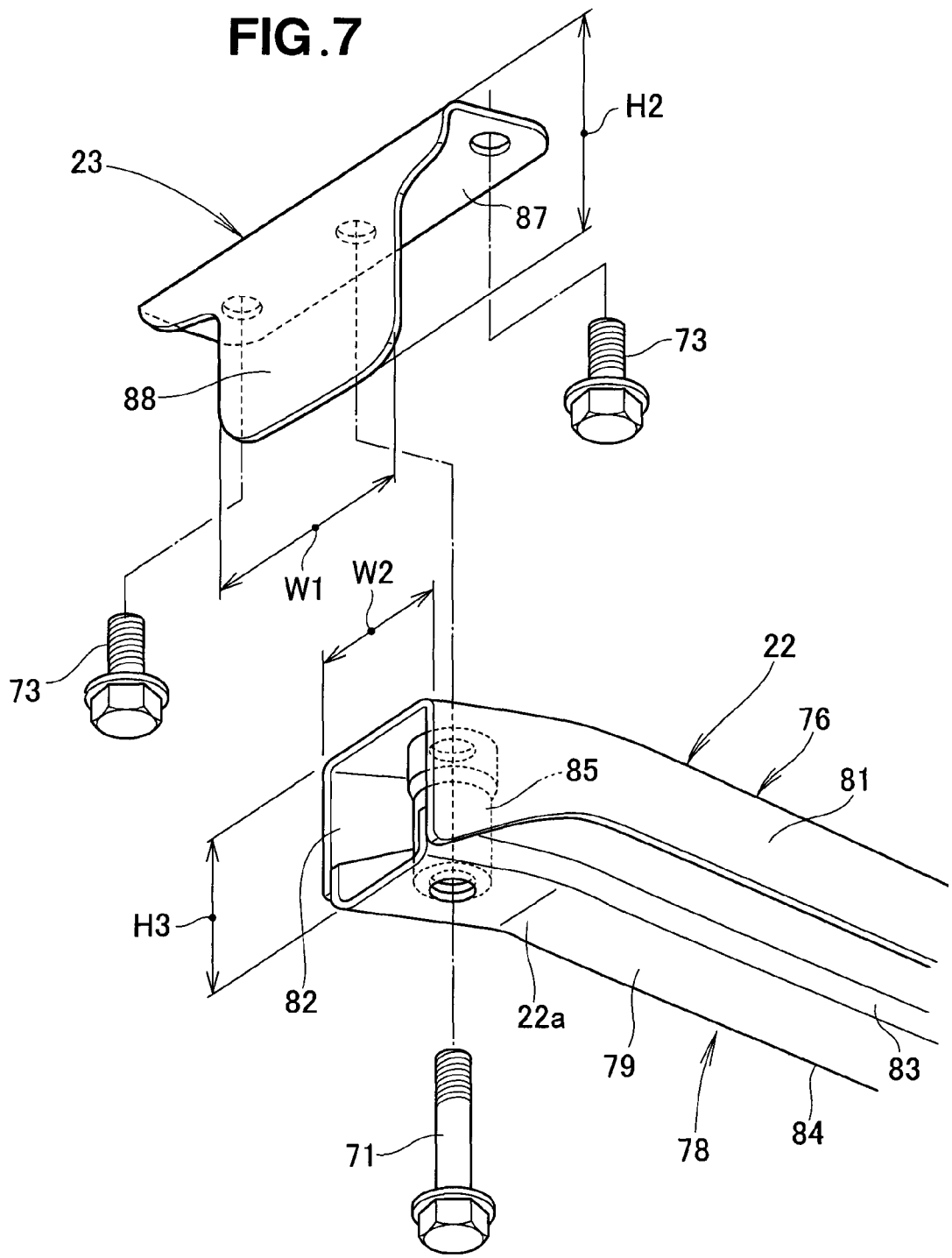

STRUCTURE FOR FRONT PORTION OF VEHICLE BODY

TECHNICAL FIELD

The present invention relates to a structure for a front portion of a vehicle body including front side frames disposed on opposite sides of the vehicle body, a front bulkhead mounted on the front side frames at front ends thereof, and a sub-frame disposed rearward of the front bulkhead.

BACKGROUND ART

A front part structure of a vehicle body is known (as disclosed, for example, in Patent Document 1), which includes front side frames disposed on opposite sides of the vehicle body, a cross member extending between front ends of the front side frames, and an impact absorbing box mounted on a front surface of the cross member. According to the vehicle body front part structure disclosed in Patent Document 1, when a load (impact load) is applied to the impact absorbing box from the front of the vehicle body, the impact absorbing box undergoes compressive deformation (collapsing deformation) to thereby absorb the impact load.

In the vehicle body front part structure disclosed in Patent Document 1, the cross member is disposed to extend between the front ends of the front side frames disposed on the opposite sides of the vehicle body, so that the cross member is located forward of an engine room. With the impact absorbing box (impact absorbing member) being mounted on the front surface of the cross member, a distance from the engine room to a front end of the impact absorbing box and hence a front end of the vehicle body is inevitably increased, which has been a hindrance of size reduction of the vehicle.

PRIOR ART LITERATURE

Patent Document

Patent Document 1: Japanese Patent No. 3031987

SUMMARY OF INVENTION

Technical Problem

It is therefore an object of the present invention to provide a vehicle body front part structure which is capable of absorbing a load applied from the front of a vehicle body and reducing a distance from an engine room to a front end of the vehicle body.

Solution to Problem

According to a first aspect of the invention, there is provided a vehicle body front part structure which includes a pair of front side frames disposed on opposite sides of a vehicle body to extend in a longitudinal direction of the vehicle body, a front bulkhead mounted on the front side frames at front ends thereof, and a sub-frame disposed rearward of the front bulkhead, comprising: an under load path member extending toward the rear of the vehicle body from a lower bulk member of the front bulkhead to the sub-frame; and a load transmission member disposed at a position closer to the front of the vehicle body than the under load path member and closer to the rear of the vehicle body than a front end of a bottom of the lower bulk member so as to transmit to the under load path member a load which is applied from the front of the vehicle body, wherein a gap is formed between the load transmission member and the under load path member.

According to a second aspect of the invention, preferably, the load transmission member includes a box portion having a substantially U-shaped cross section and disposed rearward of the front end of the bottom of the lower bulk member, and a flange portion extending rearward from the box portion, the box portion and the flange portion together forming a substantially dipper-like shape in a cross-sectional view, the flange portion is secured via a fastening member to the bottom of the lower bulk member together with a front end of the under load path member, and the lower bulk member has a front edge located above the bottom of the lower bulk member.

According to a third aspect of the invention, preferably, the under load path member is provided with a load receiving member on the front end thereof, the load receiving member having a cross section larger than that of the front end of the under load path member, and the box portion is spaced apart from the load receiving member toward the front of the vehicle body with a gap formed therebetween.

According to a fourth aspect of the invention, preferably, the box portion has a box shape formed by a bottom, left and right side walls, and front and rear walls, and has a left corner edge where the bottom and the left side wall meet together and a right corner edge where the bottom and the right side wall meet together, the under load path member has a substantially rectangular cross section formed by an upper portion, a lower portion, and left and right side walls, and has a left corner edge where the lower portion and the left side wall meet together and a right corner edge where the lower portion and the right side wall meet together, and the left corner edge of the box portion and the left corner edge of the under load path member extend in the longitudinal direction of the vehicle body, and also the right corner edge of the box portion and the right corner edge of the under load path member extend in the longitudinal direction of the vehicle body.

According to a fifth aspect of the invention, preferably, the lower bulk member is composed of a front half located closer to the front of the vehicle body and a rear half located rearward of the front half, and the front half is formed as a brittle part and the rear half is formed as a high-strength part by setting the strength of the front half lower than that of the rear half.

Advantageous Effects of Invention

In the invention according to the first aspect, the load transmission member is disposed rearward of the front end of the bottom of the lower bulk member, and thus a front portion of the lower bulk member is located forward of the load transmission member. When a light load is applied to the front portion of the lower bulk member from the front of the vehicle body, the front portion of the lower bulk member undergoes deformation to thereby absorb the light load (light impact energy). Since the load can be absorbed in this manner by the front portion of the lower bulk member, there is no need to provide an impact absorbing member in front of the lower bulk member. As a result, a distance from an engine room to a front end of the vehicle body can be reduced, leading to a size reduction of the vehicle.

Further, in the invention according to the first aspect, the gap is formed between the load transmission member and the under load path member. With this arrangement, the load transmission member is allowed to remain out of contact with the under load path member while the front portion of the lower bulk member undergoes deformation to absorb the light load (light impact energy). It is therefore possible to prevent the light load applied from the front of the vehicle body from being transmitted to the sub-frame via the load transmission member and the under load path member. Since the under load path member and the sub-frame are prevented from undergoing deformation by the effect of the light load, it is possible to eliminate the need for replacing the under load path member and the sub-frame.

In the invention according to the second aspect, the flange portion of the load transmission member is secured via the fastening member to the bottom of the lower bulk member together with the front end of the under load path member. Further, the front edge of the lower bulk member is positioned above the bottom of the lower bulk member. With this arrangement, when a relatively large load is applied to the front edge of the lower bulk member from the front of the vehicle body, the lower bulk member and the load transmission member are turned upward with the fastening member as a fulcrum.

In the state where the lower bulk member and the load transmission member are turned upward, the front portion of the lower bulk member undergoes deformation to thereby absorb part of the load (impact energy). As the front portion of the lower bulk member undergoes deformation, an obstacle comes into contact with the load transmission member.

The box portion of the load transmission member has a substantially U-shaped cross section, and the bottom of the box portion is located lower than the bottom of the lower bulk member. In the state where the lower bulk member and the load transmission member are turned upward, a front end of the bottom of the box portion is located forward of its other sections.

Formed on the front end of the bottom of the box portion is a front lower corner edge where the bottom of the box portion and the front wall of the box portion meet together. The front lower corner edge is located lower than the bottom of the lower bulk member. When the obstacle comes into contact with the front lower corner edge, rest of the load (impact energy) is transmitted to the front lower corner edge, and thereby the box portion is turned downward with the fastening member as the fulcrum. In this manner, the load transmission member is turned downward with the fastening member as the fulcrum to return to its original position.

After the load transmission member has returned to its original position, the load transmission member undergoes deformation by the effect of the load, particularly on the flange portion, so that the box portion is moved rearward. As the box portion is moved rearward, the box portion comes into contact with the front end of the under load path member. Thus, rest of the load (impact energy) transmitted to the load transmission member can be then transmitted to the sub-frame via the under load path member. Rest of the transmitted load (impact energy) can be absorbed through deformation of the under load path member and the sub-frame, and as a result, a cabin space can be kept in a good state.

In the invention according to the third aspect, the load receiving portion is mounted on the front end of the under load path member. Since the load receiving portion has a cross section larger than that of the front end of the under load path member, when the box portion of the load transmission member is moved rearward, the box portion can surely contact with the load receiving portion. In other words, the box portion moved rearward can surely be received by the load receiving portion. With this arrangement, the load transmitted to the box portion can surely be transmitted to the front end of the under load path member via the load receiving portion.

In the invention according to the fourth aspect, the box portion has the left and right corner edges, and also the under load path member has the left and right corner edges. The left corner edge of the box portion and the left corner edge of the under load path member extend in the longitudinal direction of the vehicle body, and also the right corner edge of the box portion and the right corner edge of the under load path member extend in the longitudinal direction of the vehicle body.

The left and right corner edges of the box portion and the left and right corner edges of the under load path member are each formed in a substantially salient angle in cross section, and sufficient rigidity (strength) of the left and right corner edges of the box portion and the left and right corner edges of the under load path member can thereby be secured against a load applied in a longitudinal direction thereof. Therefore, the load transmitted to the box portion can be desirably transmitted to the left and right corner edges of the under load path member via the left and right corner edges of the box portion, respectively, which makes it possible that a large load is borne by the under load path member.

In the invention according to the fifth aspect, since the front half of the lower bulk member is the brittle part, when a load is applied from the front of the vehicle body, the front half of the lower bulk member can desirably undergoes deformation to absorb the applied load (impact energy) in a suitable manner. Further, since the rear half of the lower bulk member is the high-strength part, rest of the load that is partly absorbed by the front half of the lower bulk member can be desirably transmitted to the load transmission member and the under load path member.

BRIEF DESCRIPTION OF DRAWINGS

FIG. 7 is enlarged view showing section 7 of FIG. 4;

FIG. 8A illustrates that a light load is applied from the front of the vehicle body when the front edge of the front bulkhead undergoes a light collision against an obstacle 90; and FIG. 8B shows deformation of the front half for absorbing the light load;

FIG. 9A shows a relatively large load being applied to the front edge when the front edge undergoes a front collision against the obstacle; and FIG. 9B shows upward turning of the front load transmission member due to the load applied to the front edge;

FIG. 10A shows the state where the lower bulk member and the front load transmission member are turned upward; and FIG. 10B shows the state where the lower bulk member and the front load transmission member are turned downward.

DESCRIPTION OF EMBODIMENTS

A certain preferred embodiment of the present invention will be described in detail below with reference to the accompanying drawings. In the following description, the terms "front (Fr)", "rear (Rr)", "left (L)" and "right (R)" are used to refer to directions as viewed from a human operator or driver in a vehicle.

Embodiment

Figure 1:
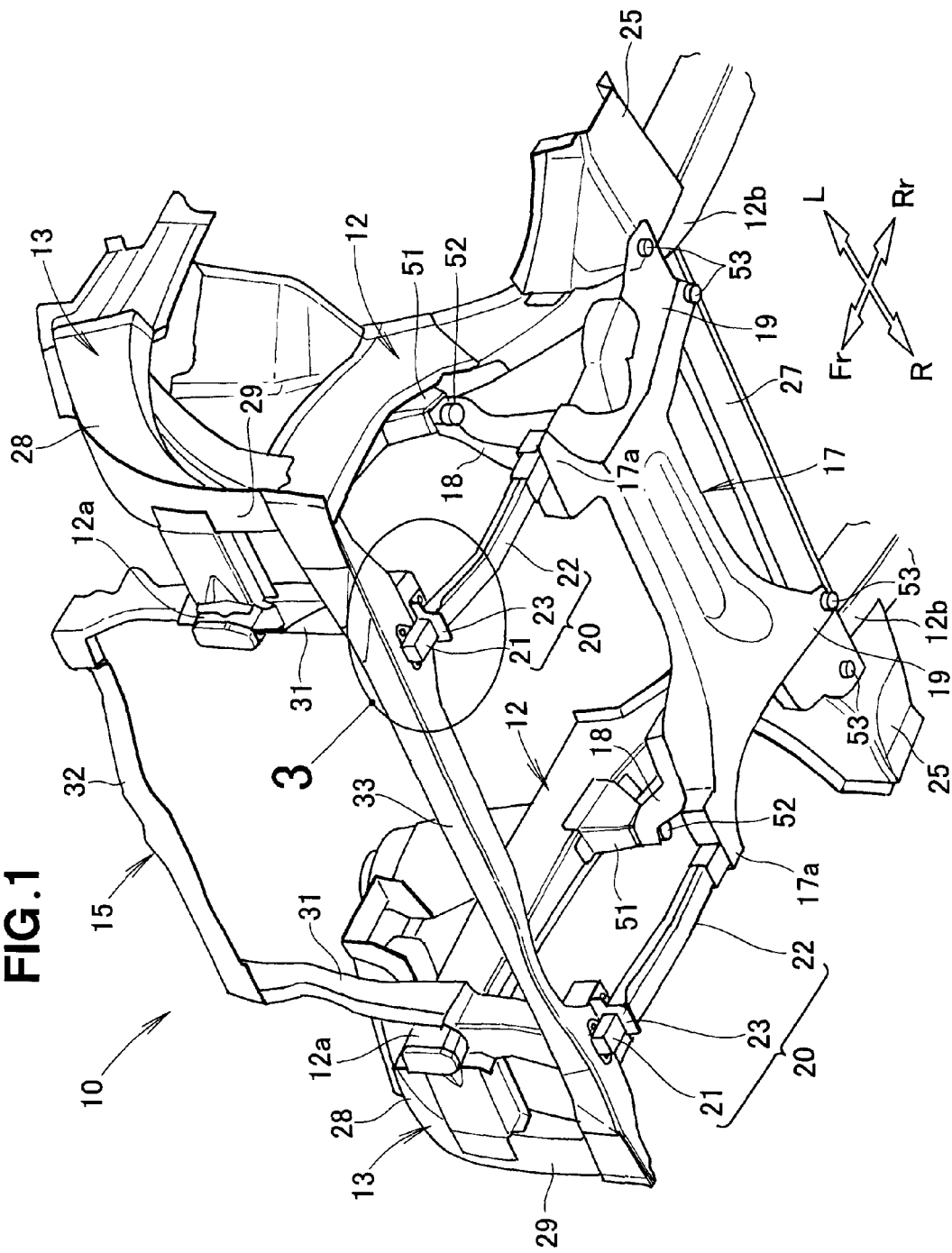
FIG. 1 is a perspective view showing a vehicle body front part structure according to an embodiment of the present invention, as viewed from below.
Figure 2:
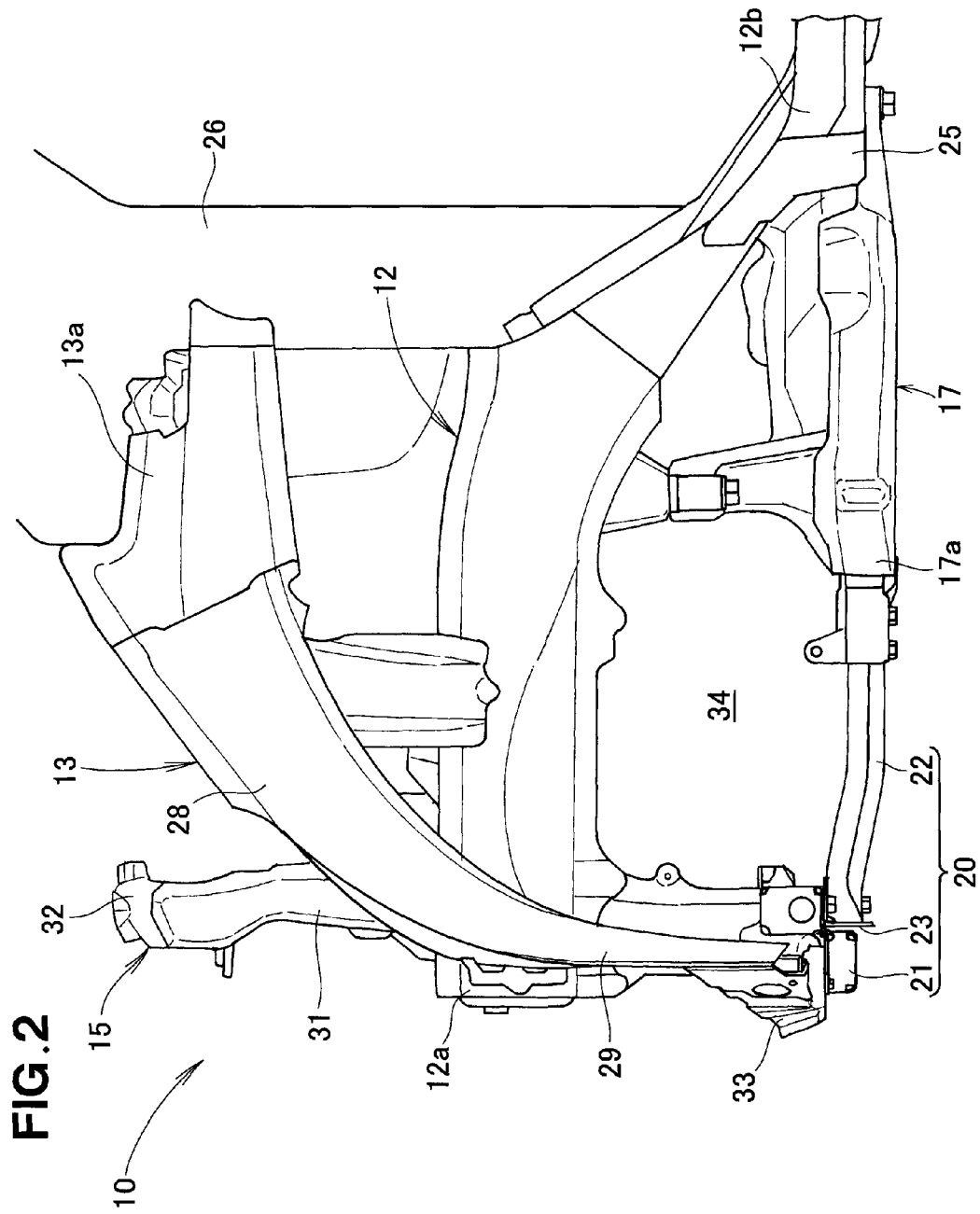
FIG. 2 is a side view showing the vehicle body front part structure of FIG. 1.

As shown in FIGS. 1 and 2, a front part of a vehicle body 10 includes left and right front side frames (a pair of front side frames) 12 extending in a longitudinal direction of the vehicle body 10, and left and right front upper members 13 disposed outward in a vehicle width direction of the left and right front side frames 12.

The front part of the vehicle body 10 further includes a front bulkhead 15 mounted on the left and right front side frames 12 at front ends 12a thereof, a sub-frame 17 disposed rearward of the front bulkhead 15, and left and right load transmission means 20 which connect the front bulkhead 15 with the sub-frame 17.

Since the front part of the vehicle body 10 has a substantially bilaterally symmetrical structure, parts and sections on the right side will be designated hereinbelow by the same reference characters to those on the left side, and their descriptions will be omitted.

The left front side frame 12 is disposed on the left side of the front part of the vehicle body 10 so as to be spaced apart from the right front side frame 12 by a predetermined distance in the vehicle width direction. The right front side frame 12 is disposed on the right side of the front part of the vehicle body 10.

The left front side frame 12 extends in the longitudinal direction of the vehicle body 10, and has an inclined rear end portion 12b to which a left side sill is connected via a left outrigger 25. Further, a cross member 27 is disposed to extend between the inclined rear end portions 12b of the left and right front side frames 12.

The left front upper member 13 is disposed outward (to the left) in the vehicle width direction of left front side frame 12, and has a rear end portion 13a connected to a left front pillar 26. The left front upper member 13 has an upper portion 28 extending obliquely forward and downward from the left front pillar 26, and a lower portion 29 extending downward from the upper portion 28.

The front bulkhead 15 includes a left side stay 31 mounted on the front end 12a of the left front side frame 12, a right side stay 31 mounted on the front end 12a of the right front side frame 12, an upper bulk member 32 extending between upper ends of the left and right side stays 31, and a lower bulk member 33 extending between lower ends of the left and right side stays 31.

Cooling system parts such as a radiator and a condenser are mounted on the front bulkhead 15. The radiator is a heat exchanger for cooling engine cooling water by outside air. The condenser cools and liquefies refrigerant gas for an air conditioner, for example.

The left side stay 31 is disposed so as to cross the front end 12a of the left front side frame 12, and has the lower end connected to an upper surface of the lower bulk member 33. The lower bulk member 33 is connected to the lower ends of the left and right side stays 31 and lower ends of the lower portions 29 of the left and right front upper members 13.

Figure 3:
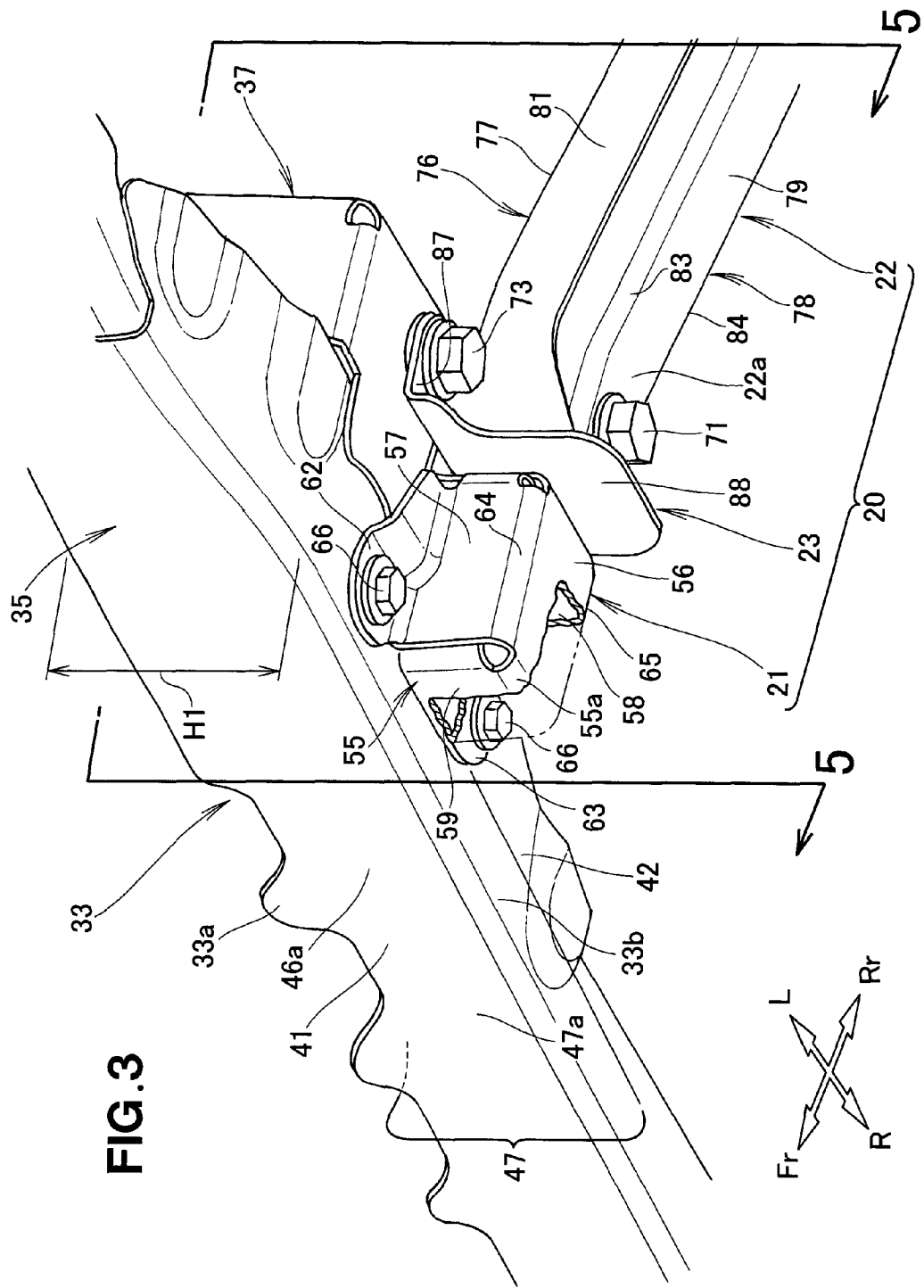
FIG. 3 is an enlarged view showing section 3 of FIG. 1.
Figure 4:
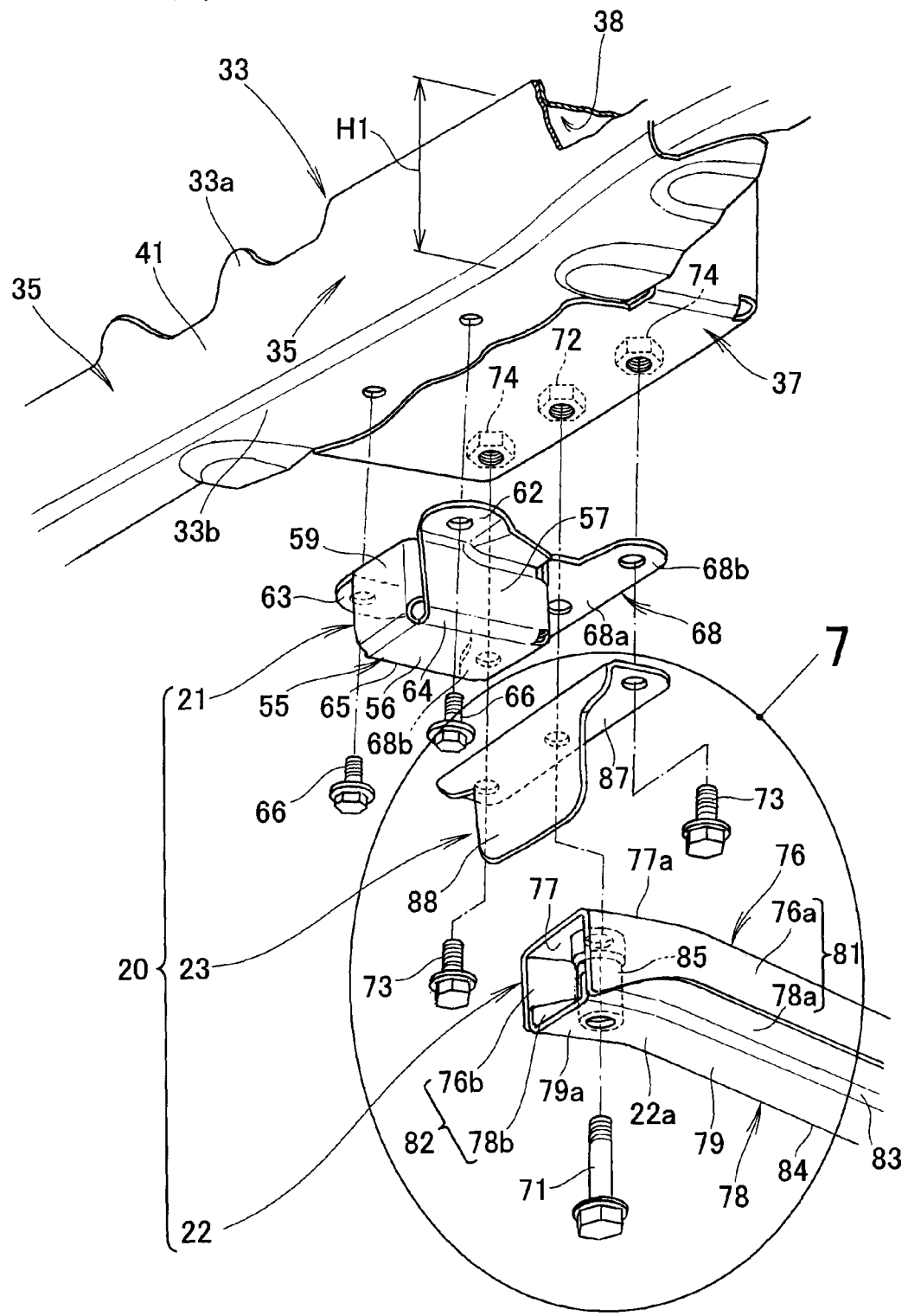
FIG. 4 is an exploded perspective view showing a left load transmission means of FIG. 3.
Figure 5A:
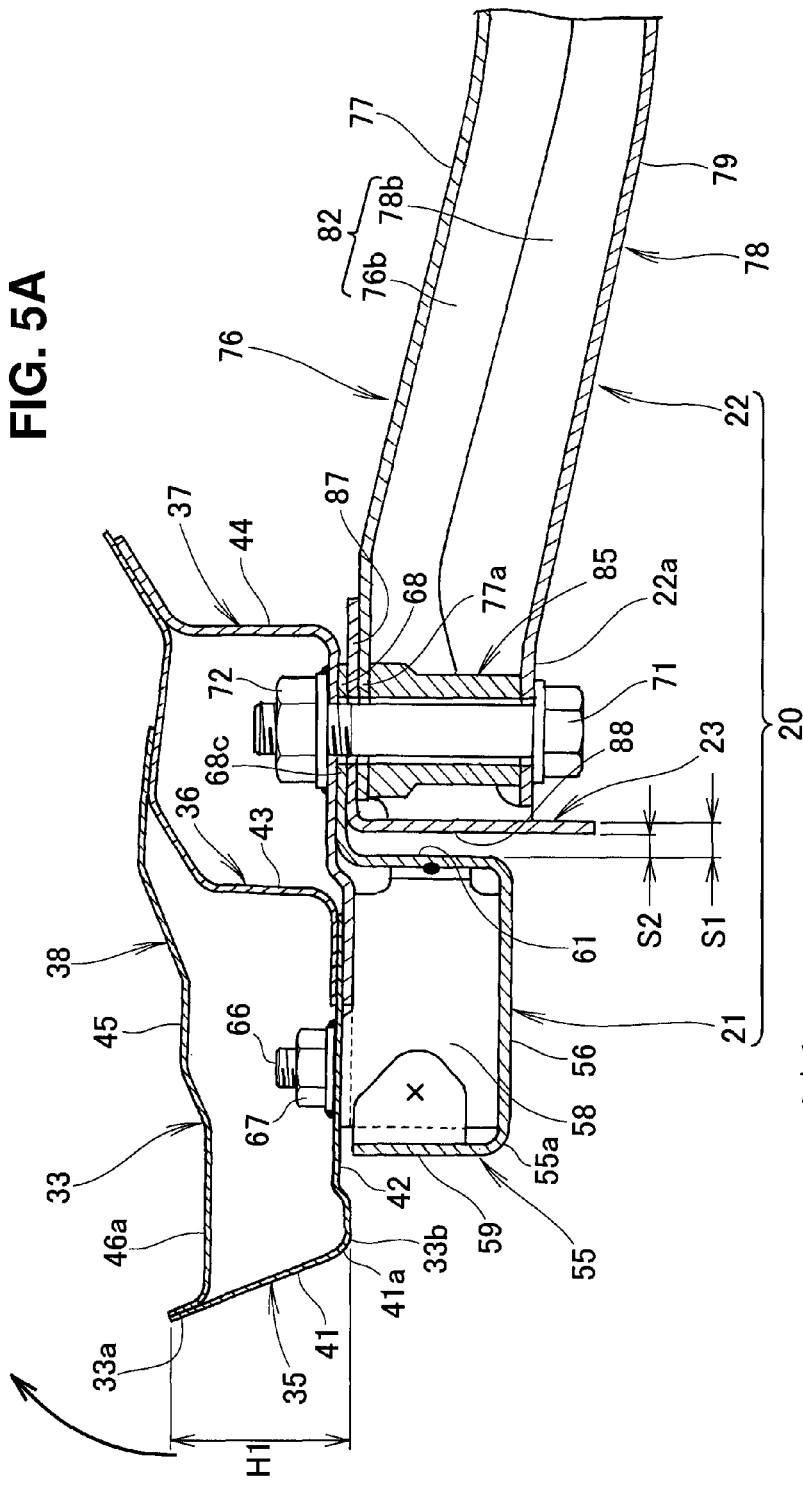
FIG. 5A is a cross-sectional view taken along line 5-5 of FIG. 3.
Figure 5B:
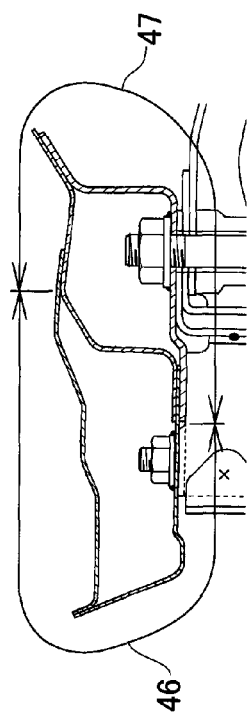
FIG. 5B is a cross-sectional view showing a lower bulk member of FIG. 5A.
Figure 6:
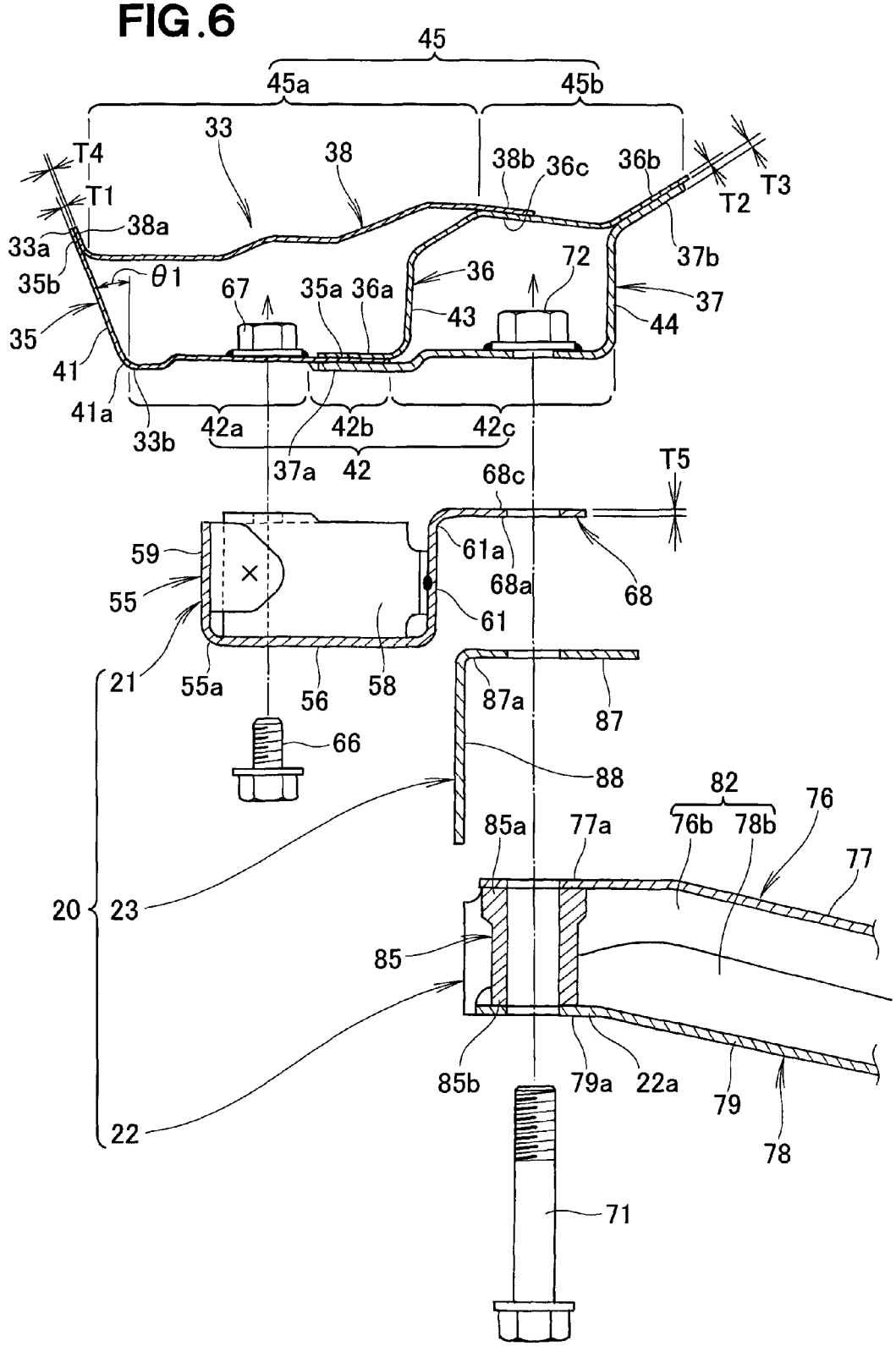
FIG. 6 is an exploded cross-sectional view showing the left load transmission means of FIG. 5A.

As shown in FIGS. 3 and 4, the lower bulk member 33 is formed by combining a front steel plate 35, a first rear steel plate 36 (FIG. 5A), a second rear steel plate 37, and a lid steel plate 38. As shown in FIGS. 5A-5B and 6, the front steel plate 35 is formed of a steel plate with thickness T1 to have a substantially L-shaped cross section. The first rear steel plate 36 is formed of a steel plate with thickness T2 to have a substantially crank shape cross section. The second rear steel plate 37 is formed of a steel plate with thickness T3 to have a substantially crank shape cross section. The lid steel plate 38 is formed of a steel plate with thickness T4 to have a substantially boat shape or wavy shape cross section.

Thicknesses T1, T2, and T3 satisfy the following relation: T1<T2<T3. That is, the front steel plate 35 is a steel plate thinner than the first rear steel plate 36 and the second rear steel plate 37.

Thicknesses T1 and T4 satisfy the following relation: T1=T3. That is, the lid steel plate 38 is a steel plate thinner than the first rear steel plate 36 and the second rear steel plate 37 similarly to the front steel plate 35.

On a rear joining section 35a of the front steel plate 35, a front joining section 36a of the first rear steel plate 36 is superposed from above, and a front joining section 37a of the second rear steel plate 37 is superposed from below.

In this manner, the rear joining section 35a of the front steel plate 35 is sandwiched between the front joining section 36a of the first rear steel plate 36 and the front joining section 37a of the second rear steel plate 37 and joined thereto.

Further, a rear joining section 36b of the first rear steel plate 36 is superposed from above on a rear joining section 37b of the second rear steel plate 37 and joined thereto. A front joining section 38a of the lid steel plate 38 is superposed from the rear on an upper joining section 35b of the front steel plate 35 and joined thereto. A rear joining section 38b of the lid steel plate 38 is superposed from above on a central joining section 36c of the first rear steel plate 36 and joined thereto.

The lower bulk member 33, which is formed in this manner by the front steel plate 35, the first rear steel plate 36, the second rear steel plate 37, and the lid steel plate 38, has a front wall 41, a bottom 42, first and second rear walls 43, 44, and an upper portion 45. The lower bulk member 33 has a substantially rectangular closed cross section formed by the front wall 41, the bottom 42, the first and second rear walls 43, 44, and the upper portion 45.

The front wall 41 extends from its lower end 41a to its upper end (i.e., front edge 33a of the lower bulk member 33) obliquely upward and forward so as to be inclined at angle θ1 with respect to a vertical line. The upper end of the front wall 41 forms the front edge 33a of the lower bulk member 33. The lower end 41a of the front wall 41 is positioned at the same height as the bottom 42 of the lower bulk member 33. Thus, the front edge 33a of the lower bulk member 33 is positioned above the bottom 42 of the lower bulk member 33 by a height H1.

The bottom 42 of the lower bulk member 33 includes a front section 42a formed by the front steel plate 35, a central section 42b formed by the front steel plate 35 together with the first and second rear steel plates 36, 37 sandwiching the front steel plate 35, and a rear section 42c formed by the second rear steel plate 37. The front section 42a of the bottom 42 has a strength (rigidity) lower than strengths of the central section 42b and the rear section 42c.s The lower bulk member 33, having a substantially rectangular closed cross section, includes a front half 46 (FIG. 5B) located closer to the front of the vehicle body 10, and a rear half 47 (FIG. 5B) located rearward of the front half 46. The front half 46 of the lower bulk member 33 is formed by the front wall 41, the front section 42a of the bottom 42, and a front section 45a of the upper portion 45. The front half 45a of the upper portion 45 is formed by the lid steel plate 38. The rear half 47 of the lower bulk member 33 is formed by the central section 42b of the bottom 42, the rear section 42c of the bottom 42, the first and second rear walls 43, 44, and a rear half 45b of the upper portion 45.

By forming the front half 46 of the lower bulk member 33 of a steel plate (with thicknesses T1, T4) thinner than the rear half 47, the front half 46 is formed as a brittle part having a strength (rigidity) lower than the rear half 47. Since the front half 46 is thus formed as the brittle part, when a load is applied from the front of the vehicle body 10, the front half 46 can desirably undergoes deformation to absorb the applied load (impact energy) in a suitable manner.

With the front half 46 being deformable to absorb the applied load, there is no need to provide an impact absorbing member in front of the lower bulk member 33. As a result, a distance from an engine room 34 (FIG. 2) to a front end of the vehicle body 10 can be reduced, leading to a size reduction of the vehicle.

Further, by forming the rear half 47 of the lower bulk member 33 of a steel plate (with thicknesses T2, T3) thicker than the front half 46, the rear half 47 is formed as a high-strength part having a strength (rigidity) higher than the front half 46. Since the rear half 47 is thus formed as the high-strength part, rest of the load (impact energy) that is partly absorbed by the front half 46 can be desirably transmitted to the left load transmission means 20 (including a front load transmission member 21 and an under load path member 22).

As shown in FIGS. 1 and 2, the sub-frame 17 is disposed rearward of the front bulkhead 15. The sub-frame 17 has left and right front support portions 18 secured to mounting brackets 51 of the left and right front side frames 12 by means of bolts 52, respectively. The sub-frame 17 further has a left rear support portion 19 secured to the left outrigger 25 and a left end of the cross member 27 by means of bolts 53, and a right rear support portion 19 secured to the right outrigger 25 and a right end of the cross member 27 by means of bolts 53. The sub-frame 17 is thus mounted beneath the left and right front side frames 12 and the cross member 27.

A steering gear box is mounted on the sub-frame 17, and a power source (such as an engine and a transmission) is connected to the sub-frame 17 via a torque rod. The sub-frame 17 is connected to the lower bulk member 33 via the load transmission means 20.

As shown in FIGS. 3 and 4, the left load transmission means 20 includes the front load transmission member (load transmission member) 21 mounted on the lower bulk member 33 at a position close to a left end thereof, the under load path member 22 disposed rearward of the front load transmission member 21, and a load receiving member 23 disposed between the front load transmission member 21 and the under load path member 22.

As shown in FIGS. 5A and 6, the front load transmission member 21 includes a box portion 55 having a substantially U-shaped cross section, and a flange portion 68 extending rearward from the box portion 55. The box portion 55 and the flange portion 68 are formed by bending a steel plate with thickness T5. The front load transmission member 21 has a substantially dipper-like shape, in a cross-sectional view, formed by the box portion 55 and the flange portion 68.

Thickness T5 of the front load transmission member 21 is larger than the thickness T1 of the front steel plate 35 and the thickness T4 of the lid steel plate 38. The box portion 55 is thus formed as a high-strength part having a strength (rigidity) higher than the front half 46 of the lower bulk member 33.

Since the box portion 55 is the high-strength part, the load transmitted to the box portion 55 can be desirably transmitted to the under load path member 22.

As shown in FIG. 3, the box portion 55 has a bottom 56, left and right side walls 57, 58, and front and rear walls 59, 61 (FIG. 6). The box portion 55 has a substantially U-shaped cross section, and the bottom 56 of the box portion 55 is located lower than the bottom 42 of the lower bulk member 33.

The box portion 55 has a front lower corner edge 55a formed by the bottom 56 and the front wall 59. The front lower corner edge 55a is located lower than the flange portion 68 (fastening section 68c) (FIG. 6). Namely, the box portion 55 is so formed that the front lower corner edge 55a is positioned lower than the flange portion 68 (fastening section 68c) for the reason detailed later.

Further, the box portion 55 has an outer attachment protruding piece 62 protruding outward in the vehicle width direction from the left side wall 57, and an inner attachment protruding piece 63 protruding inward in the vehicle width direction from the right side wall 58. The outer and inner attachment protruding pieces 62, 63 are secured to the bottom 42 (more specifically, the front section 42a of the bottom 42) of the lower bulk member 33 (FIG. 6) by means of bolts 66 and nuts 67 (FIG. 6).

In this manner, the box portion 55 is disposed at a position closer to the front of the vehicle body 10 than the under load path member 22 and closer to the rear of the vehicle body 10 than the front end 33b of the bottom 42 of the lower bulk member 33. Thus, a front portion 46a (FIG. 5A) of the front half 46 of the lower bulk member 33 (i.e., front portion of the lower bulk member 33) is positioned forward of the box portion 55.

As shown in FIGS. 3 and 6, the box portion 55 has a upwardly opened box shape formed by the bottom 56, the left and right side walls 57, 58, and the front and rear walls 59, 61. In the state where the box portion 55 is mounted on the bottom 42 of the lower bulk member 33, the opening of the box portion 55 is closed by the bottom 42.

The box portion 55, which is formed in a box shape, has a left corner edge 64 where the bottom 56 and the left side wall 57 meet together, and a right corner edge 65 where the bottom 56 and the right side wall 58 meet together.

The left and right corner edges 64, 65 of the box portion 55 are each formed in a substantially salient angle in cross section, and sufficient rigidity (strength) of the left and right corner edges 64, 65 can thereby be secured against a load applied in a longitudinal direction thereof.

As shown in FIGS. 4 and 6, the flange portion 68 of the front load transmission member 21 extends rearward from an upper end 61a of the rear wall 61 of the box portion 55. The flange portion 68 is arranged to be superposed from below on the rear section 42c of the bottom 42 of the lower bulk member 33.

On the flange portion 68 superposed on the rear section 42c of the bottom 42 of the lower bulk member 33, an attachment plate portion 87 of the load receiving member 23 is superposed from below. On the attachment plate portion 87 superposed on the flange portion 68, a front end 22a of the under load path member 22 is superposed from below.

In this state, the flange portion 68 is secured at a central section 68a thereof to the rear section 42c of the bottom 42 of the lower bulk member 33 together with the front end 22a of the under load path member 22 and the attachment plate portion 87 of the load receiving member 23 by means of a fastening bolt 71 (fastening member) and a nut 72. Further, lateral side sections 68b of the flange portion 68 are secured to the rear section 42c together with the attachment plate portion 87 of the load receiving member 23 by means of bolts 73 and nuts 74. That is, the fastening section 68c of the flange portion 68 is secured to the rear section 42c of the bottom 42 by means of the fastening bolt 71, the nut 72, the bolts 73 and the nuts 74.

The rear wall 61 of the box portion 55 is arranged to face against the front end 22a of the under load path member 22 with a load receiving plate portion (load receiving portion) 88 of the load receiving member 23 disposed therebetween. With this arrangement, when a load is applied to the box portion 55 from the front of the vehicle body 10, the rear wall 61 can be brought into contact with the front end 22a of the under load path member 22 via the load receiving plate portion 88 sandwiched therebetween.

By bringing the rear wall 61 of the box portion 55 into contact with the under load path member 22 (front end 22a) in this manner, the load applied from the front of the vehicle body 10 can be transmitted to the front end 22a of the under load path member 22 via the box portion 55 and the load receiving plate portion 88.

As shown in FIG. 5A, the fastening section 68c of the flange portion 68 is secured to the rear section 42c of the bottom 42 of the lower bulk member 33 by means of the fastening bolt 71, the nut 72, the bolts 73 (FIG. 6) and the nuts 74 (FIG. 6) as noted above. The fastening section 68c of the flange portion 68 is located lower than the front edge 33a of the lower bulk member 33.

In other words, the front edge 33a of the lower bulk member 33 is positioned higher than the fastening section 68c of the flange portion 68. With this arrangement, when a relatively large load is applied to the front edge 33a of the lower bulk member 33 from the front of the vehicle body 10, the lower bulk member 33 and the front load transmission member 21 can be turned upward with the fastening section 68c (fastening bolt 71) as a fulcrum, as shown by an arrow.

The under load path member 22 is disposed rearward of the front load transmission member 21, and a gap S1 is formed between the front load transmission member 21 and the under load path member 22. The under load path member 22 extends rearward from the lower bulk member 33 of the front bulkhead 15 (FIG. 1) to a front end 17a (FIG. 2) of the sub-frame 17

As shown in FIGS. 4 and 6, the under load path member 22 includes an upwardly disposed upper beam member 76, a lower beam member 78 designed to be fitted to the upper beam member 76 from below, and a collar 85 provided in the front end 22a.

The upper beam member 76 has a substantially U-shaped cross section opened downward, being formed by an upper portion 77, and left and right upper side walls 76a, 76b.

The lower beam member 78 has a substantially U-shaped cross section opened upward, being formed by a lower portion 79, and left and right lower side walls 78a, 78b. The left and right lower side walls 78a, 78b are formed to be fitted between the left and right upper side walls 76a, 76b. By fitting the lower beam member 78 to the upper beam member 76 from below in this manner, a left side wall 81 of the under load path member 22 is formed by the left upper side wall 76a and the left lower side wall 78a, and a right side wall 82 is formed by the right upper side wall 76b and the right lower side wall 78b.

The under load path member 22, composed of the upper beam member 76 and the lower beam member 78 fitted from below to the upper beam member 76, has a substantially rectangular closed cross section formed by the upper portion 77, the lower portion 79, and the left and right side walls 81, 82. The under load path member 22 formed in this manner has a left corner edge 83 where the lower portion 79 and the left side wall 81 meet together, and a right corner edge 84 where the lower portion 79 and the right side wall 82 meet together.

The left and right corner edges 83, 84 of the under load path member 22 are each formed in a substantially salient angle in cross section, and sufficient rigidity (strength) of the left and right corner edges 83, 84 of the under load path member 22 can thereby be secured against a load applied in a longitudinal direction thereof.

As shown in FIG. 3, the left corner edge 83 of the under load path member 22 is formed to be on an extension line of the left corner edge 64 of the box portion 55. These left corner edges 64 and 83 extend in the longitudinal direction of the vehicle body 10. The right corner edge 84 of the under load path member 22 is formed to be on an extension line of the right corner edge 65 of the box portion 55. These right corner edges 65 and 84 extend in the longitudinal direction of the vehicle body 10.

With this arrangement, the load transmitted to the box portion 55 of the front load transmission member 21 can be desirably transmitted to the left corner edge 83 of the under load path member 22 via the left corner edge 64 of the box portion 55 and to the right corner edge 84 of the under load path member 22 via the right corner edge 65 of the box portion 55.

As shown in FIGS. 5A and 6, the cylindrical collar 85 is provided in the front end 22a of the under load path member 22. The collar 85 is arranged therein to extend in a vertical direction between the upper and lower portions 77, 79 of the under load path member 22. The collar 85 has an upper end 85a held in contact with a front end 77a of the upper portion 77 and a lower end 85b held in contact with a front end 79a of the lower portion 79.

The load receiving member 23 is disposed between the box portion 55 of the front load transmission member 21 and the front end 22a of the under load path member 22. The load receiving member 23 includes the attachment plate portion 87 for attachment to the rear section 42c of the bottom 42 of the lower bulk member 33, and the load receiving plate portion 88 extending downward from a front end 87a of the attachment plate portion 87.

The attachment plate portion 87 is sandwiched between the front end 77a of the upper portion 77 of the under load path member 22 and the flange portion 68 of the front load transmission member 21. The attachment plate portion 87, which is sandwiched between the front end 77a and the flange portion 68, is secured to the rear section 42c of the bottom 42 of the lower bulk member 33 by means of the fastening bolt 71, the nut 72, the bolts 73 and the nuts 74.

The load receiving plate portion 88 extends vertically downward from the front end 87a of the attachment plate portion 87 so as to be in contact with the front end 22a of the under load path member 22. The load receiving plate portion 88 is thus mounted on the front end 22a of the under load path member 22.

As shown in FIG. 7, the load receiving plate portion 88 is formed in a substantially rectangular shape having a height H2 and a width W1. The height H2 of the load receiving plate portion 88 is greater than a height H3 of the under load path member 22. The width W1 of the load receiving plate portion 88 is greater than a width W2 of the under load path member 22.

The load receiving plate portion 88 is thus formed to have a cross section larger than that of the front end 22a of the under load path member 22, so that the entire area of the front end 22a of the under load path member 22 is covered by the load receiving plate portion 88 (see also FIG. 5A).

Therefore, when the box portion 55 of the front load transmission member 21 is moved rearward, the box portion 55 can surely contact with the load receiving plate portion 88. In other words, the rear wall 61 of the box portion 55 moved rearward can surely be received by the load receiving plate portion 88.

Further, as shown in FIG. 5A, the load receiving plate portion 88 is disposed rearward of the rear wall 61 of the box portion 55 with a gap S2 formed therebetween. In other words, the box portion 55 (rear wall 61) is disposed forward of the load receiving plate portion 88 with the gap S2.

Figure 8A:
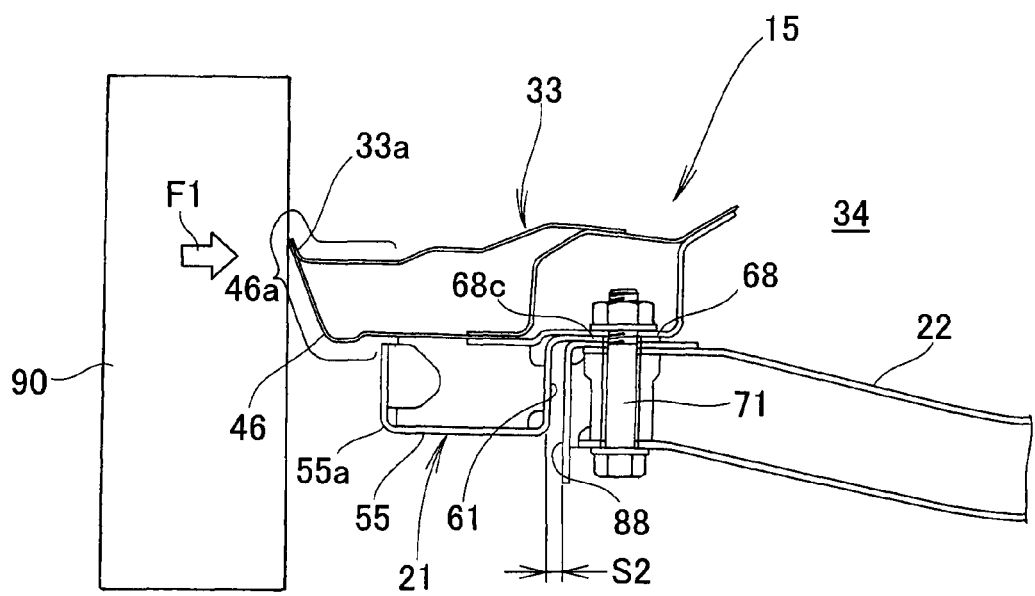
FIGS. 8A-8B are views showing an operation when a light load is applied to the lower bulk member of FIG. 5A, where

A case where a light load is applied to the lower bulk member 33 will be described with reference to FIG. 8A-8B. As shown in FIG. 8A, when the front edge 33a (of the lower bulk member 33) of the front bulkhead 15 undergoes a light collision against an obstacle 90, a light load F1 is applied from the front of the vehicle body 10 to the front edge 33a. The front portion 46a of the front half 46 of the lower bulk member 33 is located forward of the box portion 55, and the 46a of the front half 46 is formed as a brittle part.

Figure 8B:
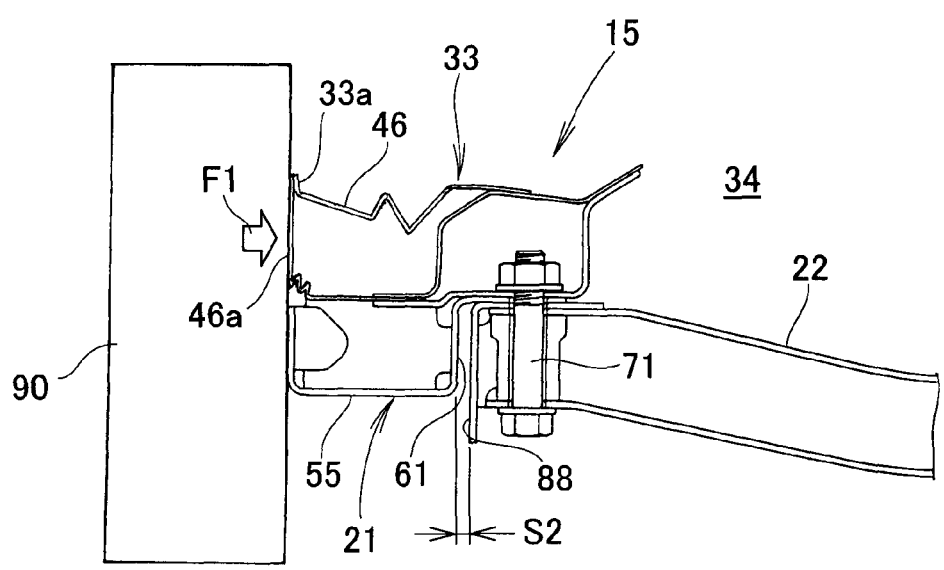

As shown in FIG. 8B, since the front portion 46a of the front half 46 is the brittle part, the front half 46 (particularly, the front portion 46a thereof) can desirably undergoes deformation to absorb the light load (light impact energy) F1 in a suitable manner.

Since the rear wall 61 of the box portion 55 is positioned forward of the load receiving plate portion 88 with the gap S2 formed therebetween, the rear wall 61 of the box portion 55 is allowed to remain out of contact with the under load path member 22 via the load receiving plate portion 88 while the light load F1 is absorbed through deformation of the front half 46 (front portion 46a thereof).

It is therefore possible to prevent the light load F1 from being transmitted to the sub-frame 17 (FIG. 2) via the load receiving plate portion 88 and the under load path member 22. Since the under load path member 22 and the sub-frame 17 are prevented from undergoing deformation by the effect of the light load F1, it is possible to eliminate the need for replacing the under load path member 22 and the sub-frame 17.

Further, since the light load F1 can be absorbed in this manner by the front half 46 (front portion 46a), there is no need to provide an impact absorbing member in front of the lower bulk member 33. As a result, the distance from the engine room 34 to the front end of the vehicle body 10 can be reduced, leading to a size reduction of the vehicle.

Figure 9A:
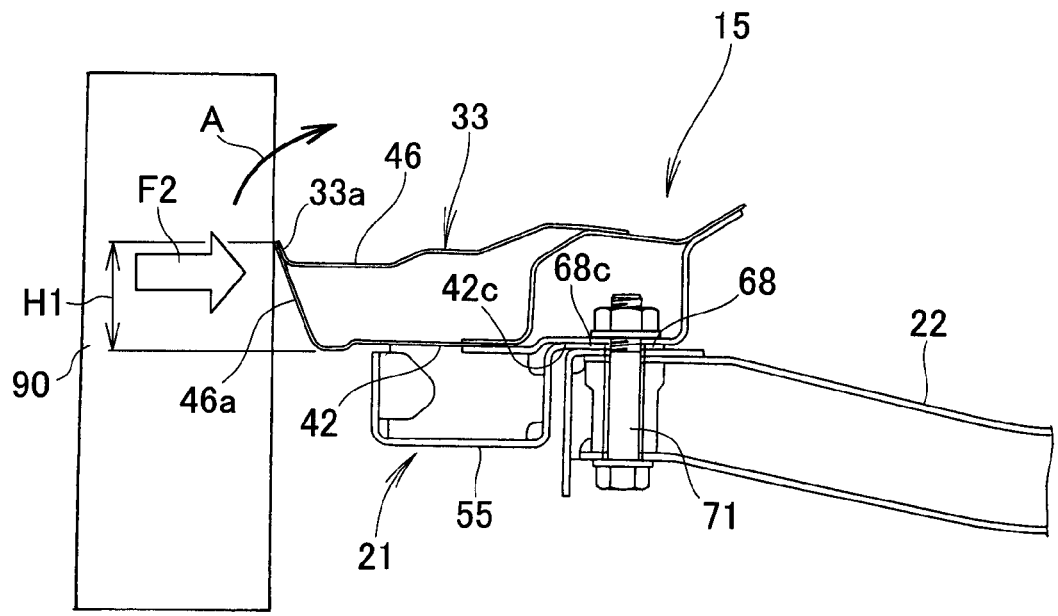
FIGS. 9A-9B are views showing an operation when a relatively large load is applied to the lower bulk member of FIG. 5A, where

Next, a case where a relatively large load is applied to the lower bulk member 33 will be described with reference to FIGS. 9A to 11. As shown in FIG. 9A, when the front edge 33a (of the lower bulk member 33) of the front bulkhead 15 undergoes a front collision against the obstacle 90, a relatively large load F2 is applied from the front of the vehicle body 10 to the front edge 33a.

The fastening section 68c (of the flange portion 68) of the front load transmission member 21 is secured to the rear section 42c of the bottom 42 of the lower bulk member 33 by means of the fastening bolt 71 and the bolts 73. Further, the front edge 33a of the lower bulk member 33 is positioned above the bottom 42 of the bottom 42 by the height H1.

Figure 9B:
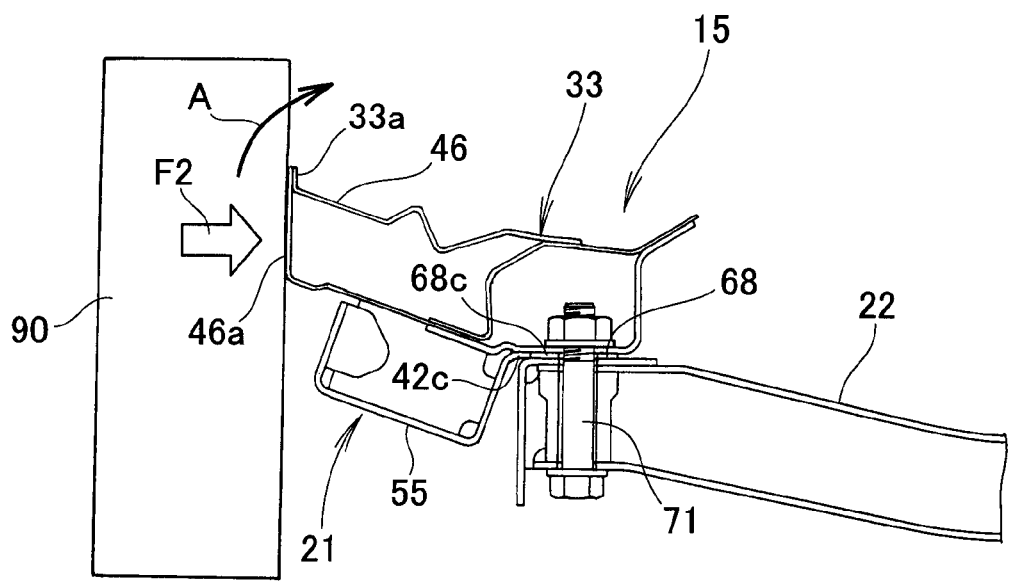

As shown in FIG. 9B, by the effect of the load F2 applied to the front edge 33a of the lower bulk member 33, the lower bulk member 33 and the front load transmission member 21 is turned upward with the fastening bolt 71 as a fulcrum, as shown by arrow A. Part of the load (impact energy) F2 is absorbed through the turning upward of the lower bulk member 33 and the front load transmission member 21.

Figure 10A:
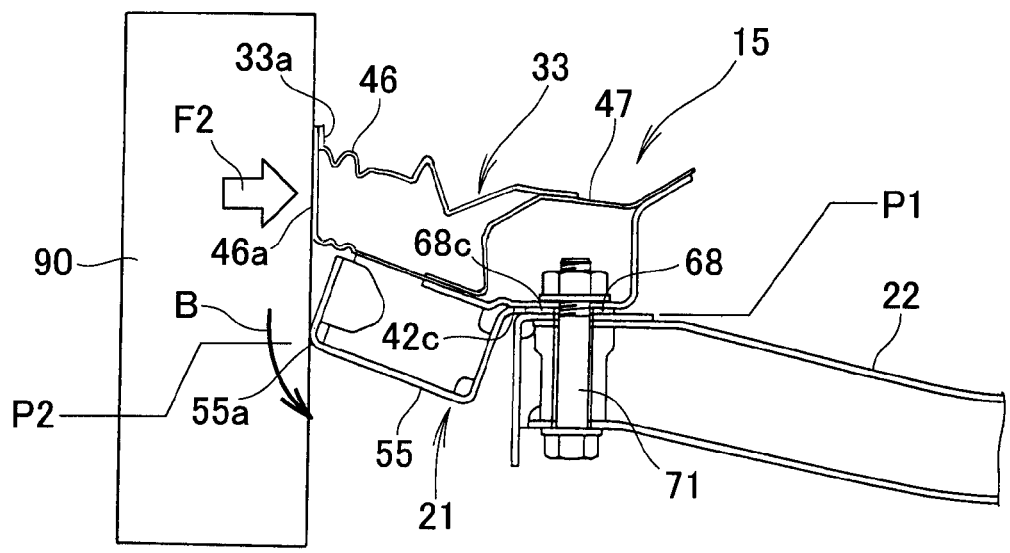
FIGS. 10A-10B are views showing how an under load path member undergoes deformation to absorb the relatively large load applied to the lower bulk member of FIGS. 9A-9B; where

As shown in Fig. 10A, in the state where the lower bulk member 33 and the front load transmission member 21 are turned upward, the front portion 46a of the front half 46 of the lower bulk member 33 undergoes deformation to thereby absorb part of the load F2. As the front portion 46a of the front half 46 undergoes deformation, the obstacle 90 comes into contact with the front lower corner edge 55a (of the box portion 55) of the front load transmission member 21.

As shown in FIG. 8A, the front lower corner edge 55a is located lower than the flange portion 68 (fastening section 68c). As shown in FIG. 10A, in the state where the lower bulk member 33 and the front load transmission member 21 are turned upward as shown by arrow A of FIG. 9A, a position P2 of the front lower corner edge 55a is located lower than a position P1 of the flange portion 68 (fastening section 68c). Further, in the state where the lower bulk member 33 and the front load transmission member 21 are turned upward as shown by arrow A of FIG. 9A, the front lower corner edge 55a is located forward of the other sections of the box portion 55.

When the obstacle 90 comes into contact with the front lower corner edge 55a, rest of the load F2 is transmitted to the front lower corner edge 55a, and thereby the lower bulk member 33 and the front load transmission member 21 are turned downward with the fastening bolt 71 as the fulcrum, as shown by arrow B.

Figure 10B:
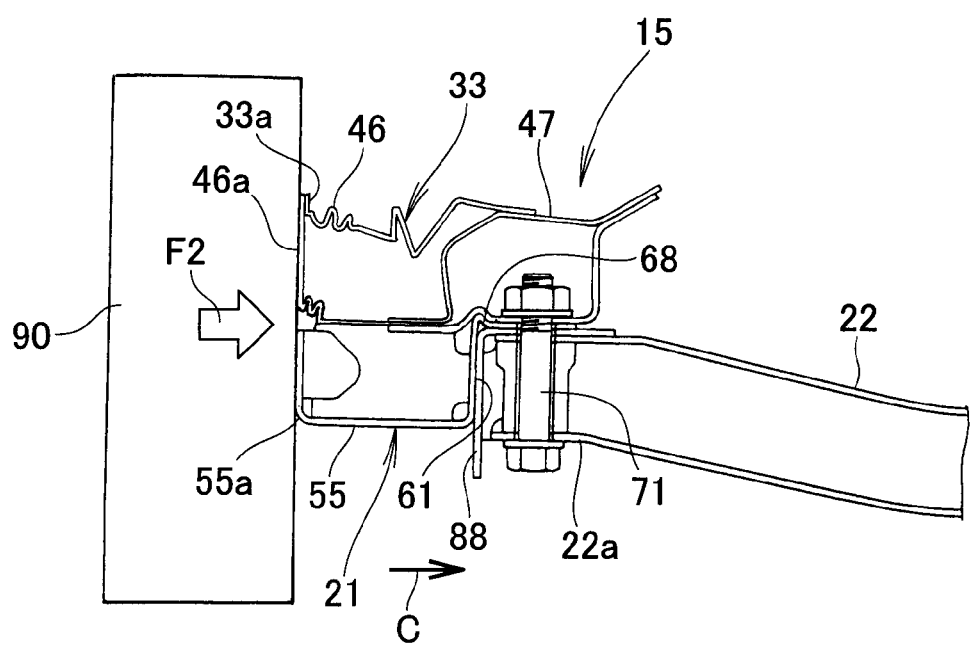

As shown in FIG. 10B, the lower bulk member 33 and the front load transmission member 21 are turned downward to bring the front load transmission member 21 to its original position. After the front load transmission member 21 has returned to its original position, the front load transmission member 21 undergoes deformation by the effect of the rest of the load F2, particularly on the flange portion 68.

As the front load transmission member 21 (flange portion 68) undergoes deformation, the box portion 55 is moved rearward as shown by arrow C, thereby bringing the rear wall 61 of the box portion 55 into contact with the load receiving plate portion 88. The rear wall 61 comes into contact with the front end 22a of the under load path member 22 via the load receiving plate portion 88.

Since the box portion 55 is formed as the high-strength part, the load transmitted to the box portion 55 can be desirably transmitted to the under load path member 22. Further since the rear half 47 of the lower bulk member 33 is formed as the high-strength part, the load transmitted to the rear half 47 can be desirably transmitted to the box portion 55 and the under load path member 22.

In this manner, rest of the load F2 transmitted to the front load transmission member 21 (box portion 55) and the rear half 47 of the lower bulk member 33 can be desirably transmitted to the sub-frame 17 (FIG. 2) via the under load path member 22. Thus, the rest of the transmitted load F2 can be absorbed through deformation of the under load path member 22 and the sub-frame 17, and as a result, a cabin space can be kept in a good state.

As noted above, the load receiving plate portion 88 is formed to have a cross section larger than that of the front end 22a of the under load path member 22. When the box portion 55 of the front load transmission member 21 is moved rearward, the box portion 55 can therefore surely contact with the load receiving plate portion 88.

In other words, the rear wall 61 of the box portion 55 moved rearward can surely be received by the load receiving plate portion 88, so that the load transmitted to the box portion 55 can be surely transmitted to the front end 22a of the under load path member 22 via the load receiving plate portion 88.

Figure 11:
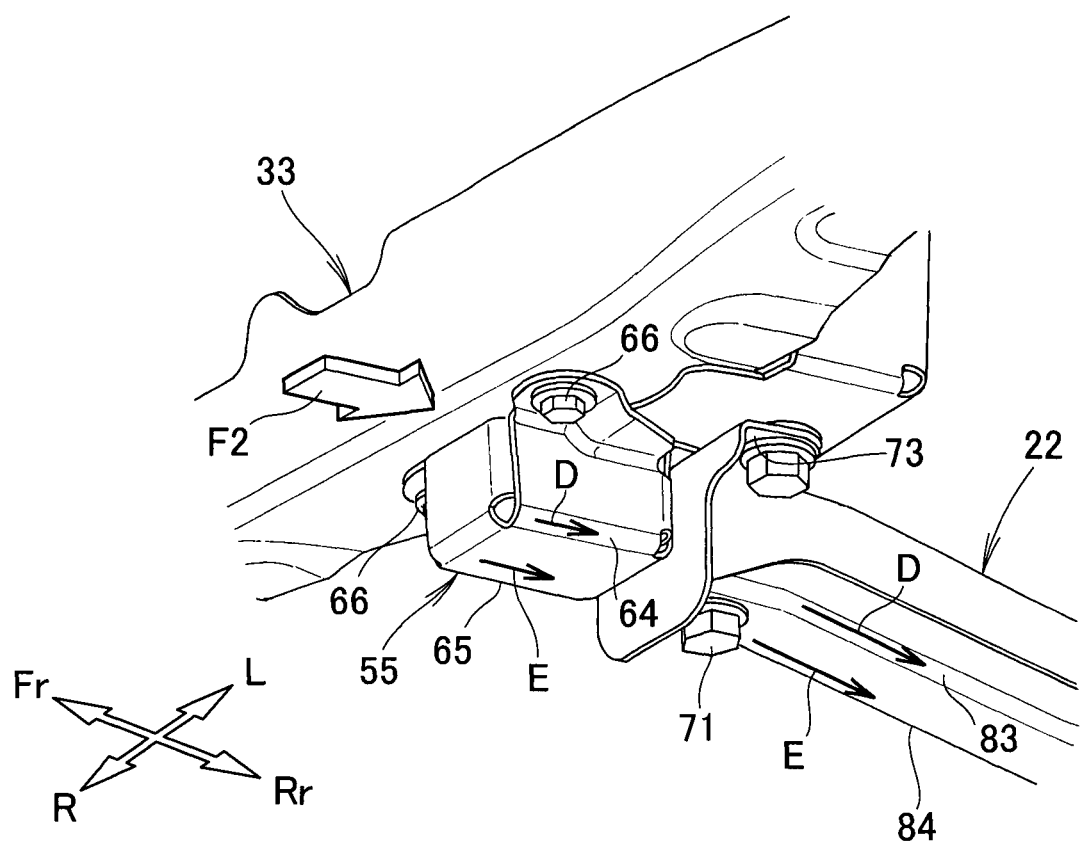
FIG. 11 is a view showing how a relatively large load is desirably transmitted to left and right corner edges of the under load path member via left and right corner edges of a box portion.

As shown in FIG. 11, the left corner edge 64 of the box portion 55 and the left corner edge 83 of the under load path member 22 are arranged to extend in the longitudinal direction of the vehicle body 10. Also, the right corner edge 65 of the box portion 55 and the right corner edge 84 of the under load path member 22 are arranged to extend in the longitudinal direction of the vehicle body 10.

With this arrangement, the rest of the load F2 transmitted to the box portion 55 can be desirably transmitted to the left corner edge 83 of the under load path member 22 via the left corner edge 64 of the box portion 55 as shown by arrow D, and to the right corner edge 84 of the under load path member 22 via the right corner edge 65 of the box portion 55 as shown by arrow E. Therefore, the rest of the load F2 can be desirably transmitted to the left and right corner edges 83, 84 of the under load path member 22 via the left and right corner edges 64, 65 of the box portion 55, respectively, which makes it possible that the large load is borne by the under load path member 22.

The vehicle body front part structure of the present invention is not limited to the embodiment described above, and various minor changes and modifications of the present invention are possible in light of the above teaching. For example, the shapes and constructions of the front part of the vehicle body 10, the left and right front side frames 12, the front bulkhead 15, the sub-frame 17, the front load transmission members 21, the under load path members 22, the load receiving members 23, the lower bulk member 33, the front and rear half 46, 47 of the lower bulk member 33, the box portion 55 and the flange portion 68 of the front load transmission member 21, the load receiving plate portion 88, etc. of the embodiment are not limited to those illustratively shown and described herein, and they may be modified as necessary.

INDUSTRIAL APPLICABILITY

The present invention is well suited for use in vehicles which include a front bulkhead mounted on front side frames at front ends thereof and a sub-frame disposed rearward of the front bulkhead.

REFERENCE CHARACTERS

10 . . . vehicle body,
12 . . . left and right front side frames (pair of front side frames),
12a . . . front ends of the left and right front side frames,
15 . . . front bulkhead,
17 . . . sub-frame,
20 . . . left and right load transmission means,
21 . . . front load transmission member (load transmission member),
22 . . . under load path member,
22a . . . front end of the under load path member,
23 . . . load receiving member,
33 . . . lower bulk member,
33a . . . front edge of the lower bulk member,
33b . . . front end of a bottom of the lower bulk member,
42 . . . bottom of the lower bulk member,
46 . . . front half of the lower bulk member,
46a . . . front portion of the front half (front portion of the lower bulk member),
47 . . . rear half of the lower bulk member,
55 . . . box portion,
56 . . . bottom of the box portion,
57, 58 . . . left and right side walls of the box portion,
59, 61 . . . front and rear walls of the box portion,
64, 65 . . . left and right corner edges of the box portion,
68 . . . flange portion,
71 . . . fastening bolt (fastening member),
77 . . . upper portion of the under load path member,
79 . . . lower portion of the under load path member,
81, 82 . . . left and right side walls of the under load path member,
83, 84 . . . left and right corner edges of the under load path member,
88 . . . load receiving plate portion (load receiving portion),
F1, F2 . . . load,
S1, S2 . . . gap

The invention claimed is:

1. A vehicle body front part structure which includes a pair of front side frames disposed on opposite sides of a vehicle body to extend in a longitudinal direction of the vehicle body, a front bulkhead mounted on the front side frames at front ends thereof, and a sub-frame disposed rearward of the front bulkhead, the structure comprising:
   an under load path member extending toward a rear part of the vehicle body from a lower bulk member of the front bulkhead to the sub-frame; and
   a load transmission member disposed at a position closer to a front part of the vehicle body than the under load path member and closer to the rear part of the vehicle body than a front end of a bottom of the lower bulk member so as to transmit to the under load path member a load which is applied from the front part of the vehicle body,
   wherein a gap is formed between the load transmission member and the under load path member,
   characterized in that:
   the load transmission member includes a box portion having a substantially U-shaped cross section and disposed rearward of the front end of the bottom of the lower bulk member, and a flange portion extending rearward from the box portion, the box portion and the flange portion together forming a substantially dipper-like shape in a cross-sectional view;
   the flange portion is secured via a fastening member to the bottom of the lower bulk member together with a front end of the under load path member; and
   the lower bulk member has a front edge located above the bottom of the lower bulk member.

2. The vehicle body front part structure of claim 1, wherein the under load path member is provided with a load receiving member on the front end thereof, the load receiving member having a cross section larger than that of the front end of the under load path member, and the box portion is spaced apart from the load receiving member toward the front of the vehicle body with a gap formed therebetween.

3. The vehicle body front part structure of claim 1, wherein the box portion has a box shape formed by a bottom, left and right side walls, and front and rear walls, and has a left corner edge where the bottom and the left side wall meet together and a right corner edge where the bottom and the right side wall meet together, wherein the under load path member has a substantially rectangular cross section formed by an upper portion, a lower portion, and left and right side walls, and has a left corner edge where the lower portion and the left side wall meet together and a right corner edge where the lower portion and the right side wall meet together, and wherein the left corner edge of the box portion and the left corner edge of the under load path member extend in the longitudinal direction of the vehicle body, and also the right corner edge of the box portion and the right corner edge of the under load path member extend in the longitudinal direction of the vehicle body.

4. The vehicle body front part structure of claim 1, wherein the lower bulk member is composed of a front half located closer to the front of the vehicle body and a rear half located rearward of the front half, and wherein the front half is formed as a brittle part and the rear half is formed as a high-strength part by setting the strength of the front half lower than that of the rear half.

* * * * *